(12) United States Patent
Tomita et al.

(10) Patent No.: US 7,177,081 B2
(45) Date of Patent: Feb. 13, 2007

(54) HIGH CONTRAST GRATING LIGHT VALVE TYPE DEVICE

(75) Inventors: Akira Tomita, Redwood City, CA (US); David Thomas Amm, Kingston (CA); Michael J. Daneman, Pacifica, CA (US); James Hunter, Campbell, CA (US); Bryan Staker, Campbell, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 0 days.

(21) Appl. No.: 09/802,619

(22) Filed: Mar. 8, 2001

(65) Prior Publication Data

US 2004/0001257 A1 Jan. 1, 2004

(51) Int. Cl.
*G02B 5/18* (2006.01)

(52) U.S. Cl. .................. 359/572; 359/573
(58) Field of Classification Search .......... 359/572, 359/573, 224, 290–295
See application file for complete search history.

(56) References Cited

U.S. PATENT DOCUMENTS

| 1,525,550 A | 2/1925 | Jenkins |
| 1,548,262 A | 8/1925 | Freedman |
| RE16,767 E | 10/1927 | Jenkins |

(Continued)

FOREIGN PATENT DOCUMENTS

| DE | 32 33 195 A1 | 3/1983 |
| DE | 43 23 799 A1 | 1/1994 |

(Continued)

OTHER PUBLICATIONS

Thomas et al., "The Mirror–Matrix Tube: A Novel Light Valve for Projection Displays," IEEE Transactions on Electron Devices, vol. ED–22, No. 9, pp. 765–775, Sep. 1975.

(Continued)

*Primary Examiner*—Drew Dunn
*Assistant Examiner*—Alessandro Amari
(74) *Attorney, Agent, or Firm*—Okamoto & Benedicto LLP (57) ABSTRACT

A grating light valve has with a plurality of spaced reflective ribbons are spatially arranged over a substrate with reflective surfaces. The grating light valve is configured to optimized the conditions for constructive and destructive interference with an incident light source having a wavelength $\lambda$. The grating light valve preferably has a set of movable active ribbons alternating between the set of stationary bias ribbons. The active ribbons and the bias ribbons are spatially separated over the substrate surface such that reflective regions of the substrate surface correspond to the spaces between the ribbons. The ribbons and reflective regions of the substrate optically and geometrically optimized for to generate the conditions for constrictive and destructive interference with the incident light source. Accordingly, ribbons of the active ribbons are configured with reflective cross sections that are is approximately equal to the sum of the diffraction cross sections of the bias ribbons and the reflective regions of the substrate. In operation, active ribbons are moved by a multiple of $\lambda/4$ to switch between the conditions for constructive and destructive interference.

10 Claims, 5 Drawing Sheets

U.S. PATENT DOCUMENTS

| | | | |
|---|---|---|---|
| 1,814,701 A | 7/1931 | Ives | |
| 2,415,226 A | 2/1947 | Sziklai | 178/5.4 |
| 2,783,406 A | 2/1957 | Vanderhooft | 313/70 |
| 2,920,529 A | 1/1960 | Blythe | 88/73 |
| 2,991,690 A | 7/1961 | Grey et al. | 88/16.6 |
| RE25,169 E | 5/1962 | Glenn | |
| 3,256,465 A | 6/1966 | Weissenstern et al. | 317/101 |
| 3,388,301 A | 6/1968 | James | 317/234 |
| 3,443,871 A | 5/1969 | Chitayat | 356/106 |
| 3,553,364 A | 1/1971 | Lee | 178/7.3 |
| 3,576,394 A | 4/1971 | Lee | 178/7.3 |
| 3,600,798 A | 8/1971 | Lee | 29/592 |
| 3,656,837 A | 4/1972 | Sandbank | 350/161 |
| 3,657,610 A | 4/1972 | Yamamoto et al. | 317/243 |
| 3,693,239 A | 9/1972 | Dix | 29/470 |
| 3,743,507 A | 7/1973 | Ih et al. | 96/81 |
| 3,752,563 A | 8/1973 | Torok et al. | 350/151 |
| 3,781,465 A | 12/1973 | Ernstoff et al. | 178/5.4 BD |
| 3,783,184 A | 1/1974 | Ernstoff et al. | 178/5.4 BD |
| 3,792,916 A | 2/1974 | Sarna | 350/163 |
| 3,802,769 A | 4/1974 | Rotz et al. | 352/43 |
| 3,811,186 A | 5/1974 | Larnerd et al. | 29/626 |
| 3,861,784 A | 1/1975 | Torok | 350/162 R |
| 3,862,360 A | 1/1975 | Dill et al. | 178/7.3 D |
| 3,871,014 A | 3/1975 | King et al. | 357/67 |
| 3,886,310 A | 5/1975 | Guldberg et al. | 178/7.5 D |
| 3,896,338 A | 7/1975 | Nathanson et al. | 315/373 |
| 3,915,548 A | 10/1975 | Opittek | 350/3.5 |
| 3,935,499 A | 1/1976 | Oess | 313/413 |
| 3,935,500 A | 1/1976 | Oess et al. | 313/495 |
| 3,938,881 A | 2/1976 | Biegelsen et al. | 350/161 |
| 3,941,456 A | 3/1976 | Schilz et al. | 350/161 |
| 3,942,245 A | 3/1976 | Jackson et al. | 29/591 |
| 3,943,281 A | 3/1976 | Keller et al. | 178/7.5 D |
| 3,947,105 A | 3/1976 | Smith | 353/121 |
| 3,969,611 A | 7/1976 | Fonteneau | 219/502 |
| 3,980,476 A | 9/1976 | Wysocki | 96/1.1 |
| 3,991,416 A | 11/1976 | Byles et al. | 340/324 R |
| 4,001,663 A | 1/1977 | Bray | 321/2 |
| 4,004,849 A | 1/1977 | Shattuck | 350/160 R |
| 4,006,968 A | 2/1977 | Ernstoff et al. | 350/160 LC |
| 4,009,939 A | 3/1977 | Okano | 350/162 SF |
| 4,011,009 A | 3/1977 | Lama et al. | 350/162 R |
| 4,012,116 A | 3/1977 | Yevick | 350/132 |
| 4,012,835 A | 3/1977 | Wallick | 29/591 |
| 4,017,158 A | 4/1977 | Booth | 350/162 SF |
| 4,020,381 A | 4/1977 | Oess et al. | 313/302 |
| 4,021,766 A | 5/1977 | Aine | 338/2 |
| 4,034,211 A | 7/1977 | Horst et al. | 235/61.12 N |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |
| 4,126,380 A | 11/1978 | Borm | 350/266 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 350/120 |
| 4,163,570 A | 8/1979 | Greenaway | 283/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Sprague et al. | 350/358 |
| 4,348,079 A | 9/1982 | Johnson | 350/358 |
| 4,355,463 A | 10/1982 | Burns | 29/827 |
| 4,361,384 A | 11/1982 | Bosserman | 350/174 |
| 4,369,524 A | 1/1983 | Rawson et al. | 455/606 |
| 4,374,397 A | 2/1983 | Mir | 358/75 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.14 |
| 4,398,798 A | 8/1983 | Krawczak et al. | 350/162.24 |
| 4,400,740 A | 8/1983 | Traino et al. | 358/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A | 4/1985 | Scully | 350/403 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PH |
| 4,615,595 A | 10/1986 | Hornbeck | 353/122 |
| 4,623,219 A | 11/1986 | Trias | 350/351 |
| 4,636,039 A | 1/1987 | Turner | 350/356 |

| | | | | | | | |
|---|---|---|---|---|---|---|---|
| 4,636,866 A | 1/1987 | Hattori | 358/236 | 4,950,890 A | 8/1990 | Gelbart | 250/237 G |
| 4,641,193 A | 2/1987 | Glenn | 358/233 | 4,952,925 A | 8/1990 | Haastert | 340/784 |
| 4,645,881 A | 2/1987 | LeToumelin et al. | 379/252 | 4,954,789 A | 9/1990 | Sampsell | 330/4.3 |
| 4,646,158 A | 2/1987 | Ohno et al. | 358/236 | 4,956,619 A | 9/1990 | Hornbeck | 330/4.3 |
| 4,649,085 A | 3/1987 | Landram | 428/620 | 4,961,633 A | 10/1990 | Ibrahim et al. | 350/392 |
| 4,649,432 A | 3/1987 | Watanabe | 358/241 | 4,963,012 A | 10/1990 | Tracy et al. | 350/641 |
| 4,652,932 A | 3/1987 | Miyajima et al. | 358/236 | 4,970,575 A | 11/1990 | Soga et al. | 357/72 |
| 4,655,539 A | 4/1987 | Caulfield et al. | 350/3.6 | 4,978,202 A | 12/1990 | Yang | 350/331 R |
| 4,660,938 A | 4/1987 | Kazan | 350/355 | 4,982,184 A | 1/1991 | Kirkwood | 340/783 |
| 4,661,828 A | 4/1987 | Miller, Jr. et al. | 346/108 | 4,982,265 A | 1/1991 | Watanabe et al. | 357/75 |
| 4,662,746 A | 5/1987 | Hornbeck | 350/269 | 4,984,824 A | 1/1991 | Antes et al. | 283/91 |
| 4,663,670 A | 5/1987 | Ito et al. | 358/245 | 4,999,308 A | 3/1991 | Nishiura et al. | 437/4 |
| 4,687,326 A | 8/1987 | Corby, Jr. | 356/5 | 5,003,300 A | 3/1991 | Wells | 340/705 |
| 4,698,602 A | 10/1987 | Armitage | 332/7.51 | 5,009,473 A | 4/1991 | Hunter et al. | 350/6.6 |
| 4,700,276 A | 10/1987 | Freyman et al. | 361/403 | 5,013,141 A | 5/1991 | Sakata | 350/348 |
| 4,707,064 A | 11/1987 | Dobrowolski et al. | 350/96.19 | 5,018,256 A | 5/1991 | Hornbeck | 29/25.01 |
| 4,709,995 A | 12/1987 | Kuribayashi et al. | 350/350 | 5,022,750 A | 6/1991 | Flasck | 353/31 |
| 4,710,732 A | 12/1987 | Hornbeck | 332/7.51 | 5,023,905 A | 6/1991 | Wells et al. | 379/96 |
| 4,711,526 A | 12/1987 | Hennings et al. | 350/170 | 5,024,494 A | 6/1991 | Williams et al. | 350/3.6 |
| 4,714,326 A | 12/1987 | Usui et al. | 350/485 | 5,028,939 A | 7/1991 | Hornbeck et al. | 346/160 |
| 4,717,066 A | 1/1988 | Goldenberg et al. | 228/179 | 5,035,473 A | 7/1991 | Kuwayama et al. | 350/3.7 |
| 4,719,507 A | 1/1988 | Bos | 358/92 | 5,037,173 A | 8/1991 | Sampsell et al. | 385/17 |
| 4,721,629 A | 1/1988 | Sakai et al. | 427/35 | 5,039,628 A | 8/1991 | Carey | 437/183 |
| 4,722,593 A | 2/1988 | Shimazaki | 350/350 | 5,040,052 A | 8/1991 | McDavid | 357/80 |
| 4,724,467 A | 2/1988 | Yip et al. | 355/71 | 5,041,395 A | 8/1991 | Steffen | 437/206 |
| 4,728,185 A | 3/1988 | Thomas | 353/122 | 5,041,851 A | 8/1991 | Nelson | 346/160 |
| 4,743,091 A | 5/1988 | Gelbart | 350/252 | 5,043,917 A | 8/1991 | Okamoto | 364/518 |
| 4,744,633 A | 5/1988 | Sheiman | 350/132 | 5,048,077 A | 9/1991 | Wells et al. | 379/96 |
| 4,747,671 A | 5/1988 | Takahashi et al. | 350/336 | 5,049,901 A | 9/1991 | Gelbart | 346/108 |
| 4,751,509 A | 6/1988 | Kubota et al. | 340/784 | 5,058,992 A | 10/1991 | Takahashi | 359/567 |
| 4,761,253 A | 8/1988 | Antes | 264/1.3 | 5,060,058 A | 10/1991 | Goldenberg et al. | 358/60 |
| 4,763,975 A | 8/1988 | Scifres et al. | 350/96.15 | 5,061,049 A | 10/1991 | Hornbeck | 359/224 |
| 4,765,865 A | 8/1988 | Gealer et al. | 156/647 | 5,066,614 A | 11/1991 | Dunnaway et al. | 437/209 |
| 4,772,094 A | 9/1988 | Sheiman | 350/133 | 5,068,205 A | 11/1991 | Baxter et al. | 437/205 |
| 4,797,694 A | 1/1989 | Agostinelli et al. | 346/160 | 5,072,239 A | 12/1991 | Mitcham et al. | 346/108 |
| 4,797,918 A | 1/1989 | Lee et al. | 380/20 | 5,072,418 A | 12/1991 | Boutaud et al. | 364/715.06 |
| 4,801,194 A | 1/1989 | Agostinelli et al. | 350/356 | 5,074,947 A | 12/1991 | Estes et al. | 156/307.3 |
| 4,803,560 A | 2/1989 | Matsunaga et al. | 359/236 | 5,075,940 A | 12/1991 | Kuriyama et al. | 29/25.03 |
| 4,804,641 A | 2/1989 | Arlt et al. | 437/227 | 5,079,544 A | 1/1992 | DeMond et al. | 340/701 |
| 4,807,021 A | 2/1989 | Okumura | 357/75 | 5,081,617 A | 1/1992 | Gelbart | 369/112 |
| 4,807,965 A | 2/1989 | Garakani | 350/131 | 5,083,857 A | 1/1992 | Hornbeck | 359/291 |
| 4,809,078 A | 2/1989 | Yabe et al. | 358/236 | 5,085,497 A | 2/1992 | Um et al. | 359/848 |
| 4,811,082 A | 3/1989 | Jacobs et al. | 357/80 | 5,089,903 A | 2/1992 | Kuwayama et al. | 359/15 |
| 4,811,210 A | 3/1989 | McAulay | 364/200 | 5,093,281 A | 3/1992 | Eshima | 437/217 |
| 4,814,759 A | 3/1989 | Gombrich et al. | 340/771 | 5,096,279 A | 3/1992 | Hornbeck et al. | 359/230 |
| 4,817,850 A | 4/1989 | Wiener-Avnear et al. | 228/119 | 5,099,353 A | 3/1992 | Hornbeck | 359/291 |
| 4,824,200 A | 4/1989 | Isono et al. | 350/96.16 | 5,101,184 A | 3/1992 | Antes | 235/454 |
| 4,827,391 A | 5/1989 | Sills | 363/41 | 5,101,236 A | 3/1992 | Nelson et al. | 355/229 |
| 4,829,365 A | 5/1989 | Eichenlaub | 358/3 | 5,103,334 A | 4/1992 | Swanberg | 359/197 |
| 4,836,649 A | 6/1989 | Ledebuhr et al. | 350/331 R | 5,105,207 A | 4/1992 | Nelson | 346/160 |
| 4,856,863 A | 8/1989 | Sampsell et al. | 350/96.16 | 5,105,299 A | 4/1992 | Anderson et al. | 359/223 |
| 4,856,869 A | 8/1989 | Sakata et al. | 350/162.18 | 5,105,369 A | 4/1992 | Nelson | 364/525 |
| 4,859,012 A | 8/1989 | Cohn | 350/96.24 | 5,107,372 A | 4/1992 | Gelbart et al. | 359/824 |
| 4,859,060 A | 8/1989 | Katagiri et al. | 356/352 | 5,112,436 A | 5/1992 | Bol | 156/643 |
| 4,866,488 A | 9/1989 | Frensley | 357/4 | 5,113,272 A | 5/1992 | Reamey | 359/53 |
| 4,882,683 A | 11/1989 | Rupp et al. | 364/521 | 5,113,285 A | 5/1992 | Franklin et al. | 359/465 |
| 4,893,509 A | 1/1990 | MacIver et al. | 73/517 AV | 5,115,344 A | 5/1992 | Jaskie | 359/573 |
| 4,896,325 A | 1/1990 | Coldren | 372/20 | 5,119,204 A | 6/1992 | Hashimoto et al. | 359/254 |
| 4,896,948 A | 1/1990 | Dono et al. | 350/355 | 5,121,343 A | 6/1992 | Faris | 395/111 |
| 4,897,708 A | 1/1990 | Clements | 357/65 | 5,126,812 A | 6/1992 | Greiff | 357/25 |
| 4,902,083 A | 2/1990 | Wells | 350/6.6 | 5,126,826 A | 6/1992 | Kauchi et al. | 357/72 |
| 4,915,463 A | 4/1990 | Barbee, Jr. | 350/1.1 | 5,126,836 A | 6/1992 | Um | 358/60 |
| 4,915,479 A | 4/1990 | Clarke | 350/345 | 5,128,660 A | 7/1992 | DeMond et al. | 340/707 |
| 4,924,413 A | 5/1990 | Suwannukul | 364/521 | 5,129,716 A | 7/1992 | Holakovszky et al. | 351/50 |
| 4,926,241 A | 5/1990 | Carey | 357/75 | 5,132,723 A | 7/1992 | Gelbart | 355/40 |
| 4,930,043 A | 5/1990 | Wiegand | 361/283 | 5,132,812 A | 7/1992 | Takahashi et al. | 359/9 |
| 4,934,773 A | 6/1990 | Becker | 350/6.6 | 5,136,695 A | 8/1992 | Goldshlag et al. | 395/275 |
| 4,940,309 A | 7/1990 | Baum | 350/171 | 5,137,836 A | 8/1992 | Lam | 437/8 |
| 4,943,815 A | 7/1990 | Aldrich et al. | 346/108 | 5,142,303 A | 8/1992 | Nelson | 346/108 |
| 4,945,773 A | 8/1990 | Sickafus | 73/862.59 | 5,142,405 A | 8/1992 | Hornbeck | 359/226 |
| 4,949,148 A | 8/1990 | Bartelink | 357/74 | 5,142,677 A | 8/1992 | Ehlig et al. | 395/650 |

| Patent No. | Date | Inventor | Class |
|---|---|---|---|
| 5,144,472 A | 9/1992 | Sang, Jr. et al. | 359/254 |
| 5,147,815 A | 9/1992 | Casto | 437/51 |
| 5,148,157 A | 9/1992 | Florence | 340/783 |
| 5,148,506 A | 9/1992 | McDonald | 385/16 |
| 5,149,405 A | 9/1992 | Bruns et al. | 204/129.1 |
| 5,150,205 A | 9/1992 | Um et al. | 358/60 |
| 5,151,718 A | 9/1992 | Nelson | 346/160 |
| 5,151,724 A | 9/1992 | Kikinis | 357/17 |
| 5,151,763 A | 9/1992 | Marek et al. | 357/26 |
| 5,153,770 A | 10/1992 | Harris | 359/245 |
| 5,155,604 A | 10/1992 | Miekka et al. | 359/2 |
| 5,155,615 A | 10/1992 | Tagawa | 359/213 |
| 5,155,778 A | 10/1992 | Magel et al. | 385/18 |
| 5,155,812 A | 10/1992 | Ehlig et al. | 395/275 |
| 5,157,304 A | 10/1992 | Kane et al. | 313/495 |
| 5,159,485 A | 10/1992 | Nelson | 359/291 |
| 5,161,042 A | 11/1992 | Hamada | 359/41 |
| 5,162,787 A | 11/1992 | Thompson et al. | 340/794 |
| 5,164,019 A | 11/1992 | Sinton | 136/249 |
| 5,165,013 A | 11/1992 | Faris | 395/104 |
| 5,168,401 A | 12/1992 | Endriz | 359/625 |
| 5,168,406 A | 12/1992 | Nelson | 359/855 |
| 5,170,156 A | 12/1992 | DeMond et al. | 340/794 |
| 5,170,269 A | 12/1992 | Lin et al. | 359/9 |
| 5,170,283 A | 12/1992 | O'Brien et al. | 359/291 |
| 5,172,161 A | 12/1992 | Nelson | 355/200 |
| 5,172,262 A | 12/1992 | Hornbeck | 359/223 |
| 5,177,724 A | 1/1993 | Gelbart | 369/44.16 |
| 5,178,728 A | 1/1993 | Boysel et al. | 156/656 |
| 5,179,274 A | 1/1993 | Sampsell | 250/208.2 |
| 5,179,367 A | 1/1993 | Shimizu | 340/700 |
| 5,181,231 A | 1/1993 | Parikh et al. | 377/2 |
| 5,182,665 A | 1/1993 | O'Callaghan et al. | 359/95 |
| 5,185,660 A | 2/1993 | Um | 358/60 |
| 5,188,280 A | 2/1993 | Nakao et al. | 228/123 |
| 5,189,404 A | 2/1993 | Masimo et al. | 340/720 |
| 5,189,505 A | 2/1993 | Bartelink | 257/419 |
| 5,191,405 A | 3/1993 | Tomita et al. | 257/777 |
| 5,192,864 A | 3/1993 | McEwen et al. | 250/234 |
| 5,192,946 A | 3/1993 | Thompson et al. | 340/794 |
| 5,198,895 A | 3/1993 | Vick | 358/103 |
| D334,557 S | 4/1993 | Hunter et al. | D14/114 |
| D334,742 S | 4/1993 | Hunter et al. | D14/113 |
| 5,202,785 A | 4/1993 | Nelson | 359/214 |
| 5,206,629 A | 4/1993 | DeMond et al. | 340/719 |
| 5,208,818 A | 5/1993 | Gelbart et al. | 372/30 |
| 5,208,891 A | 5/1993 | Prysner | 385/116 |
| 5,210,637 A | 5/1993 | Puzey | 359/263 |
| 5,212,115 A | 5/1993 | Cho et al. | 437/208 |
| 5,212,555 A | 5/1993 | Stoltz | 358/206 |
| 5,212,582 A | 5/1993 | Nelson | 359/291 |
| 5,214,308 A | 5/1993 | Nishquchi et al. | 257/692 |
| 5,214,419 A | 5/1993 | DeMond et al. | 340/794 |
| 5,214,420 A | 5/1993 | Thompson et al. | 340/795 |
| 5,216,537 A | 6/1993 | Hornbeck | 359/291 |
| 5,216,544 A | 6/1993 | Horikawa et al. | 359/622 |
| 5,219,794 A | 6/1993 | Satoh et al. | 437/209 |
| 5,220,200 A | 6/1993 | Blanton | 257/778 |
| 5,221,400 A | 6/1993 | Staller et al. | 156/292 |
| 5,221,982 A | 6/1993 | Faris | 359/93 |
| 5,224,088 A | 6/1993 | Atiya | 369/97 |
| D337,320 S | 7/1993 | Hunter et al. | D14/113 |
| 5,226,099 A | 7/1993 | Mignardi et al. | 385/19 |
| 5,230,005 A | 7/1993 | Rubino et al. | 372/20 |
| 5,231,363 A | 7/1993 | Sano et al. | 332/109 |
| 5,231,388 A | 7/1993 | Stoltz | 340/783 |
| 5,231,432 A | 7/1993 | Glenn | 353/31 |
| 5,233,456 A | 8/1993 | Nelson | 359/214 |
| 5,233,460 A | 8/1993 | Partlo et al. | 359/247 |
| 5,233,874 A | 8/1993 | Putty et al. | 73/517 AV |
| 5,237,340 A | 8/1993 | Nelson | 346/108 |
| 5,237,435 A | 8/1993 | Kurematsu et al. | 359/41 |
| 5,239,448 A | 8/1993 | Perkins et al. | 361/764 |
| 5,239,806 A | 8/1993 | Maslakow | 53/432 |
| 5,240,818 A | 8/1993 | Mignardi et al. | 430/321 |
| 5,245,686 A | 9/1993 | Faris et al. | 385/120 |
| 5,247,180 A | 9/1993 | Mitcham et al. | 250/492.1 |
| 5,247,593 A | 9/1993 | Lin et al. | 385/17 |
| 5,249,245 A | 9/1993 | Lebby et al. | 385/89 |
| 5,251,057 A | 10/1993 | Guerin et al. | 359/249 |
| 5,251,058 A | 10/1993 | MacArthur | 359/249 |
| 5,254,980 A | 10/1993 | Hendrix et al. | 345/84 |
| 5,255,100 A | 10/1993 | Urbanus | 358/231 |
| 5,256,869 A | 10/1993 | Lin et al. | 250/201.9 |
| 5,258,325 A | 11/1993 | Spitzer et al. | 437/86 |
| 5,260,718 A | 11/1993 | Rommelmann et al. | 346/107 R |
| 5,260,798 A | 11/1993 | Um et al. | 358/233 |
| 5,262,000 A | 11/1993 | Welbourn et al. | 156/643 |
| 5,272,473 A | 12/1993 | Thompson et al. | 345/7 |
| 5,278,652 A | 1/1994 | Urbanus et al. | 358/160 |
| 5,278,925 A | 1/1994 | Boysel et al. | 385/14 |
| 5,280,277 A | 1/1994 | Hornbeck | 345/108 |
| 5,281,887 A | 1/1994 | Engle | 310/335 |
| 5,281,957 A | 1/1994 | Schoolman | 345/8 |
| 5,285,105 A | 2/1994 | Cain | 257/672 |
| 5,285,196 A | 2/1994 | Gale, Jr. | 345/108 |
| 5,285,407 A | 2/1994 | Gale et al. | 365/189.11 |
| 5,287,096 A | 2/1994 | Thompson et al. | 345/147 |
| 5,287,215 A | 2/1994 | Warde et al. | 359/293 |
| 5,289,172 A | 2/1994 | Gale, Jr. et al. | 345/108 |
| 5,291,317 A | 3/1994 | Newswanger | 359/15 |
| 5,291,473 A | 3/1994 | Pauli | 369/112 |
| 5,293,511 A | 3/1994 | Poradish et al. | 257/434 |
| 5,296,408 A | 3/1994 | Wilbarg et al. | 437/203 |
| 5,296,891 A | 3/1994 | Vogt et al. | 355/67 |
| 5,296,950 A | 3/1994 | Lin et al. | 359/9 |
| 5,298,460 A | 3/1994 | Nishiguchi et al. | 437/183 |
| 5,299,037 A | 3/1994 | Sakata | 359/41 |
| 5,299,289 A | 3/1994 | Omae et al. | 359/95 |
| 5,300,813 A | 4/1994 | Joshi et al. | 257/752 |
| 5,301,062 A | 4/1994 | Takahashi et al. | 359/567 |
| 5,303,043 A | 4/1994 | Glenn | 348/40 |
| 5,303,055 A | 4/1994 | Hendrix et al. | 348/761 |
| 5,307,056 A | 4/1994 | Urbanus | 340/189 |
| 5,307,185 A | 4/1994 | Jones et al. | 359/41 |
| 5,310,624 A | 5/1994 | Ehrlich | 430/322 |
| 5,311,349 A | 5/1994 | Anderson et al. | 359/223 |
| 5,311,360 A | 5/1994 | Bloom et al. | 359/572 |
| 5,312,513 A | 5/1994 | Florence et al. | 156/643 |
| 5,313,479 A | 5/1994 | Florence | 372/26 |
| 5,313,648 A | 5/1994 | Ehlig et al. | 395/800 |
| 5,313,835 A | 5/1994 | Dunn | 73/505 |
| 5,315,418 A | 5/1994 | Sprague et al. | 359/41 |
| 5,315,423 A | 5/1994 | Hong | 359/124 |
| 5,319,214 A | 6/1994 | Gregory et al. | 250/504 R |
| 5,319,668 A | 6/1994 | Luecke | 372/107 |
| 5,319,789 A | 6/1994 | Ehlig et al. | 395/800 |
| 5,319,792 A | 6/1994 | Ehlig et al. | 395/800 |
| 5,321,416 A | 6/1994 | Bassett et al. | 345/8 |
| 5,323,002 A | 6/1994 | Sampsell et al. | 250/252.1 |
| 5,323,051 A | 6/1994 | Adams et al. | 257/417 |
| 5,325,116 A | 6/1994 | Sampsell | 346/108 |
| 5,327,286 A | 7/1994 | Sampsell et al. | 359/561 |
| 5,329,289 A | 7/1994 | Sakamoto et al. | 345/126 |
| 5,330,301 A | 7/1994 | Brancher | 414/417 |
| 5,330,878 A | 7/1994 | Nelson | 430/311 |
| 5,331,454 A | 7/1994 | Hornbeck | 359/224 |
| 5,334,991 A | 8/1994 | Wells et al. | 345/8 |
| 5,339,116 A | 8/1994 | Urbanus et al. | 348/716 |
| 5,339,177 A | 8/1994 | Jenkins et al. | 359/35 |
| 5,340,772 A | 8/1994 | Rosotker | 437/226 |
| 5,345,521 A | 9/1994 | McDonald et al. | 385/19 |

| Patent No. | Date | Inventor | Class |
|---|---|---|---|
| 5,347,321 A | 9/1994 | Gove | 348/663 |
| 5,347,378 A | 9/1994 | Handschy et al. | 359/53 |
| 5,347,433 A | 9/1994 | Sedlmayr | 362/32 |
| 5,348,619 A | 9/1994 | Bohannon et al. | 156/664 |
| 5,349,687 A | 9/1994 | Ehlig et al. | 395/800 |
| 5,351,052 A | 9/1994 | D'Hont et al. | 342/42 |
| 5,352,926 A | 10/1994 | Andrews | 257/717 |
| 5,354,416 A | 10/1994 | Okudaira | 156/643 |
| 5,357,369 A | 10/1994 | Pilling et al. | 359/462 |
| 5,357,803 A | 10/1994 | Lane | 73/517 B |
| 5,359,349 A | 10/1994 | Jambor et al. | 345/168 |
| 5,359,451 A | 10/1994 | Gelbart et al. | 359/285 |
| 5,361,131 A | 11/1994 | Tekemori et al. | 356/355 |
| 5,363,220 A | 11/1994 | Kuwayama et al. | 359/3 |
| 5,365,283 A | 11/1994 | Doherty et al. | 348/743 |
| 5,367,585 A | 11/1994 | Ghezzo et al. | 385/23 |
| 5,370,742 A | 12/1994 | Mitchell et al. | 134/10 |
| 5,371,543 A | 12/1994 | Anderson | 348/270 |
| 5,371,618 A | 12/1994 | Tai et al. | 359/53 |
| 5,377,705 A | 1/1995 | Smith, Jr. et al. | 134/95.3 |
| 5,382,961 A | 1/1995 | Gale, Jr. | 345/108 |
| 5,387,924 A | 2/1995 | Gale, Jr. et al. | 345/108 |
| 5,389,182 A | 2/1995 | Mignardi | 156/344 |
| 5,391,881 A | 2/1995 | Jeuch et al. | 250/370.09 |
| 5,392,140 A | 2/1995 | Ezra et al. | 359/41 |
| 5,392,151 A | 2/1995 | Nelson | 359/223 |
| 5,394,303 A | 2/1995 | Yamaji | 361/749 |
| 5,398,071 A | 3/1995 | Gove et al. | 348/558 |
| 5,399,898 A | 3/1995 | Rostoker | 257/499 |
| 5,404,365 A | 4/1995 | Hiiro | 372/27 |
| 5,404,485 A | 4/1995 | Ban | 395/425 |
| 5,408,123 A | 4/1995 | Murai | 257/531 |
| 5,410,315 A | 4/1995 | Huber | 342/42 |
| 5,411,769 A | 5/1995 | Hornbeck | 427/534 |
| 5,412,186 A | 5/1995 | Gale | 219/679 |
| 5,412,501 A | 5/1995 | Fisli | 359/286 |
| 5,418,584 A | 5/1995 | Larson | 353/122 |
| 5,420,655 A | 5/1995 | Shimizu | 353/33 |
| 5,420,722 A | 5/1995 | Bielak | 359/708 |
| 5,426,072 A | 6/1995 | Finnila | 437/208 |
| 5,427,975 A | 6/1995 | Sparks et al. | 437/79 |
| 5,430,524 A | 7/1995 | Nelson | 355/200 |
| 5,435,876 A | 7/1995 | Alfaro et al. | 156/247 |
| 5,438,477 A | 8/1995 | Pasch | 361/689 |
| 5,439,731 A | 8/1995 | Li et al. | 428/209 |
| 5,442,411 A | 8/1995 | Urbanus et al. | 348/771 |
| 5,442,414 A | 8/1995 | Janssen et al. | 353/98 |
| 5,444,566 A | 8/1995 | Gale et al. | 359/291 |
| 5,445,559 A | 8/1995 | Gale et al. | 451/388 |
| 5,446,479 A | 8/1995 | Thompson et al. | 345/139 |
| 5,447,600 A | 9/1995 | Webb | 216/2 |
| 5,448,314 A | 9/1995 | Heimbuch et al. | 348/743 |
| 5,448,546 A | 9/1995 | Pauli | 369/112 |
| 5,450,088 A | 9/1995 | Meier et al. | 342/51 |
| 5,450,219 A | 9/1995 | Gold et al. | 359/40 |
| 5,451,103 A | 9/1995 | Hatanaka et al. | 353/31 |
| 5,452,024 A | 9/1995 | Sampsell | 348/755 |
| 5,452,138 A | 9/1995 | Mignardi et al. | 359/855 |
| 5,453,747 A | 9/1995 | D'Hont et al. | 342/42 |
| 5,453,778 A | 9/1995 | Venkateswar et al. | 347/239 |
| 5,453,803 A | 9/1995 | Shapiro et al. | 353/119 |
| 5,454,160 A | 10/1995 | Nickel | 29/840 |
| 5,454,906 A | 10/1995 | Baker et al. | 216/66 |
| 5,455,445 A | 10/1995 | Kurtz et al. | 257/419 |
| 5,455,455 A | 10/1995 | Badehi | 257/690 |
| 5,455,602 A | 10/1995 | Tew | 347/239 |
| 5,457,493 A | 10/1995 | Leddy et al. | 348/164 |
| 5,457,566 A | 10/1995 | Sampsell et al. | 359/292 |
| 5,457,567 A | 10/1995 | Shinohara | 359/305 |
| 5,458,716 A | 10/1995 | Alfaro et al. | 156/245 |
| 5,459,492 A | 10/1995 | Venkateswar | 347/253 |
| 5,459,528 A | 10/1995 | Pettitt | 348/568 |
| 5,459,592 A | 10/1995 | Shibatani et al. | 359/40 |
| 5,459,610 A | 10/1995 | Bloom et al. | 359/572 |
| 5,461,197 A | 10/1995 | Hiruta et al. | 174/52.4 |
| 5,461,410 A | 10/1995 | Venkateswar et al. | 347/240 |
| 5,461,411 A | 10/1995 | Florence et al. | 347/240 |
| 5,461,547 A | 10/1995 | Ciupke et al. | 362/31 |
| 5,463,347 A | 10/1995 | Jones et al. | 330/253 |
| 5,463,497 A | 10/1995 | Muraki et al. | 359/618 |
| 5,465,175 A | 11/1995 | Woodgate et al. | 359/463 |
| 5,467,106 A | 11/1995 | Salomon | 345/87 |
| 5,467,138 A | 11/1995 | Gove | 348/452 |
| 5,467,146 A | 11/1995 | Huang et al. | 348/743 |
| 5,469,302 A | 11/1995 | Lim | 359/846 |
| 5,471,341 A | 11/1995 | Warde et al. | 359/293 |
| 5,473,512 A | 12/1995 | Degani et al. | 361/760 |
| 5,475,236 A | 12/1995 | Yoshizaki | 257/48 |
| 5,480,839 A | 1/1996 | Ezawa et al. | 437/209 |
| 5,481,118 A | 1/1996 | Tew | 250/551 |
| 5,481,133 A | 1/1996 | Hsu | 257/621 |
| 5,482,564 A | 1/1996 | Douglas et al. | 134/18 |
| 5,482,818 A | 1/1996 | Nelson | 430/394 |
| 5,483,307 A | 1/1996 | Anderson | 353/98 |
| 5,485,172 A | 1/1996 | Sawachika et al. | 345/8 |
| 5,485,304 A | 1/1996 | Kaeriyama | 359/291 |
| 5,485,354 A | 1/1996 | Ciupke et al. | 362/31 |
| 5,486,698 A | 1/1996 | Hanson et al. | 250/332 |
| 5,486,841 A | 1/1996 | Hara et al. | 345/8 |
| 5,486,946 A | 1/1996 | Jachimowicz et al. | 359/263 |
| 5,488,431 A | 1/1996 | Gove et al. | 348/716 |
| 5,489,952 A | 2/1996 | Gove et al. | 348/771 |
| 5,490,009 A | 2/1996 | Venkateswar et al. | 359/291 |
| 5,491,510 A | 2/1996 | Gove | 348/77 |
| 5,491,612 A | 2/1996 | Nicewarner, Jr. | 361/760 |
| 5,491,715 A | 2/1996 | Flaxl | 375/344 |
| 5,493,177 A | 2/1996 | Muller et al. | 313/578 |
| 5,493,439 A | 2/1996 | Engle | 359/292 |
| 5,497,172 A | 3/1996 | Doherty et al. | 345/85 |
| 5,497,197 A | 3/1996 | Gove et al. | 348/388 |
| 5,497,262 A | 3/1996 | Kaeriyama | 359/223 |
| 5,499,060 A | 3/1996 | Gove et al. | 348/651 |
| 5,499,062 A | 3/1996 | Urbanus | 348/771 |
| 5,500,761 A | 3/1996 | Goossen et al. | 359/290 |
| 5,502,481 A | 3/1996 | Dentinger et al. | 348/51 |
| 5,504,504 A | 4/1996 | Markandey et al. | 345/214 |
| 5,504,514 A | 4/1996 | Nelson | 347/130 |
| 5,504,575 A | 4/1996 | Stafford | 356/330 |
| 5,504,614 A | 4/1996 | Webb et al. | 359/223 |
| 5,506,171 A | 4/1996 | Leonard et al. | 437/187 |
| 5,506,597 A | 4/1996 | Thompson et al. | 345/85 |
| 5,506,720 A | 4/1996 | Yoon | 359/224 |
| 5,508,558 A | 4/1996 | Robinette, Jr. et al. | 257/700 |
| 5,508,561 A | 4/1996 | Tago et al. | 257/737 |
| 5,508,565 A | 4/1996 | Hatakeyama et al. | 257/777 |
| 5,508,750 A | 4/1996 | Hewlett et al. | 348/558 |
| 5,508,840 A | 4/1996 | Vogel et al. | 359/291 |
| 5,508,841 A | 4/1996 | Lin et al. | 359/318 |
| 5,510,758 A | 4/1996 | Fujita et al. | 333/247 |
| 5,510,824 A | 4/1996 | Nelson | 347/239 |
| 5,512,374 A | 4/1996 | Wallace et al. | 428/422 |
| 5,512,748 A | 4/1996 | Hanson | 250/332 |
| 5,515,076 A | 5/1996 | Thompson et al. | 345/139 |
| 5,516,125 A | 5/1996 | McKenna | 279/3 |
| 5,517,340 A | 5/1996 | Doany et al. | 359/41 |
| 5,517,347 A | 5/1996 | Sampsell | 359/224 |
| 5,517,357 A | 5/1996 | Shibayama | 359/547 |
| 5,517,359 A | 5/1996 | Gelbart | 359/623 |
| 5,519,251 A | 5/1996 | Sato et al. | 257/666 |
| 5,519,450 A | 5/1996 | Urbanus et al. | 348/600 |
| 5,521,748 A | 5/1996 | Sarraf | 359/321 |
| 5,523,619 A | 6/1996 | McAllister et al. | 257/686 |

| Patent No. | Date | Inventor | Class |
|---|---|---|---|
| 5,523,628 A | 6/1996 | Williams et al. | 257/777 |
| 5,523,803 A | 6/1996 | Urbanus et al. | 348/771 |
| 5,523,878 A | 6/1996 | Wallace et al. | 359/290 |
| 5,523,881 A | 6/1996 | Florence et al. | 359/561 |
| 5,523,920 A | 6/1996 | Machuga et al. | 361/767 |
| 5,524,155 A | 6/1996 | Weaver | 385/24 |
| 5,526,834 A | 6/1996 | Mielnik et al. | 134/105 |
| 5,534,107 A | 7/1996 | Gray et al. | 156/643.1 |
| 5,534,883 A | 7/1996 | Koh | 345/3 |
| 5,539,422 A | 7/1996 | Heacock et al. | 345/8 |
| 5,544,306 A | 8/1996 | Deering et al. | 395/164 |
| 5,554,304 A | 9/1996 | Suzuki | 216/2 |
| 5,576,878 A | 11/1996 | Henck | 359/224 |
| 5,602,671 A | 2/1997 | Hornbeck | 359/224 |
| 5,606,181 A | 2/1997 | Sakuma et al. | 257/88 |
| 5,606,447 A | 2/1997 | Asada et al. | 359/199 |
| 5,610,438 A | 3/1997 | Wallace et al. | 257/682 |
| 5,623,361 A | 4/1997 | Engle | 359/291 |
| 5,629,566 A | 5/1997 | Doi et al. | 257/789 |
| 5,629,801 A | 5/1997 | Staker et al. | 359/572 |
| 5,640,216 A | 6/1997 | Hasegawa et al. | 349/58 |
| 5,658,698 A | 8/1997 | Yagi et al. | 430/11 |
| 5,661,592 A | 8/1997 | Bornstein et al. | 359/291 |
| 5,661,593 A | 8/1997 | Engle | 359/292 |
| 5,663,817 A | 9/1997 | Frapin et al. | 349/5 |
| 5,668,611 A | 9/1997 | Ernstoff et al. | 348/771 |
| 5,673,139 A | 9/1997 | Johnson | 359/291 |
| 5,677,783 A | 10/1997 | Bloom et al. | 359/224 |
| 5,689,361 A | 11/1997 | Damen et al. | 359/284 |
| 5,691,836 A | 11/1997 | Clark | 359/247 |
| 5,694,740 A | 12/1997 | Martin et al. | 53/431 |
| 5,696,560 A | 12/1997 | Songer | 348/436 |
| 5,699,740 A | 12/1997 | Gelbart | 101/477 |
| 5,704,700 A | 1/1998 | Kappel et al. | 353/31 |
| 5,707,160 A | 1/1998 | Bowen | 400/472 |
| 5,712,649 A | 1/1998 | Tosaki | 345/8 |
| 5,713,652 A | 2/1998 | Zavracky et al. | 353/122 |
| 5,726,480 A | 3/1998 | Pister | 257/415 |
| 5,731,802 A | 3/1998 | Aras et al. | 345/148 |
| 5,734,224 A | 3/1998 | Tagawa et al. | 313/493 |
| 5,742,373 A | 4/1998 | Alvelda | 349/204 |
| 5,744,752 A | 4/1998 | McHerron et al. | 174/52.4 |
| 5,745,271 A | 4/1998 | Ford et al. | 359/130 |
| 5,757,354 A | 5/1998 | Kawamura | 345/148 |
| 5,757,536 A | 5/1998 | Ricco et al. | 359/224 |
| 5,764,280 A | 6/1998 | Bloom et al. | 348/53 |
| 5,768,009 A | 6/1998 | Little | 359/293 |
| 5,770,473 A | 6/1998 | Hall et al. | 438/26 |
| 5,793,519 A | 8/1998 | Furlani et al. | 359/291 |
| 5,798,743 A | 8/1998 | Bloom | 345/90 |
| 5,798,805 A | 8/1998 | Ooi et al. | 349/10 |
| 5,801,074 A | 9/1998 | Kim et al. | 438/125 |
| 5,802,222 A | 9/1998 | Rasch et al. | 385/1 |
| 5,808,323 A | 9/1998 | Spaeth et al. | 257/88 |
| 5,808,797 A | 9/1998 | Bloom et al. | 359/572 |
| 5,815,126 A | 9/1998 | Fan et al. | 345/8 |
| 5,825,443 A | 10/1998 | Kawasaki et al. | 349/95 |
| 5,835,255 A | 11/1998 | Miles | 359/224 |
| 5,835,256 A | 11/1998 | Huibers | 359/291 |
| 5,837,562 A | 11/1998 | Cho | 438/51 |
| 5,841,579 A | 11/1998 | Bloom et al. | 359/572 |
| 5,844,711 A | 12/1998 | Long, Jr. | 359/291 |
| 5,847,859 A | 12/1998 | Murata | 359/201 |
| 5,862,164 A | 1/1999 | Hill | 372/27 |
| 5,868,854 A | 2/1999 | Kojima et al. | 134/1.3 |
| 5,886,675 A | 3/1999 | Aye et al. | 345/7 |
| 5,892,505 A | 4/1999 | Tropper | 345/208 |
| 5,895,233 A | 4/1999 | Higashi et al. | 438/107 |
| 5,898,515 A | 4/1999 | Furlani et al. | 359/290 |
| 5,903,243 A | 5/1999 | Jones | 345/7 |
| 5,903,395 A | 5/1999 | Rallison et al. | 359/630 |
| 5,904,737 A | 5/1999 | Preston et al. | 8/158 |
| 5,910,856 A | 6/1999 | Ghosh et al. | 359/291 |
| 5,912,094 A | 6/1999 | Aksyuk et al. | 430/5 |
| 5,912,608 A | 6/1999 | Asada | 335/222 |
| 5,914,801 A | 6/1999 | Dhuler et al. | 359/230 |
| 5,915,168 A | 6/1999 | Salatino et al. | 438/110 |
| 5,919,548 A | 7/1999 | Barron et al. | 428/138 |
| 5,920,411 A | 7/1999 | Duck et al. | 359/127 |
| 5,920,418 A | 7/1999 | Shiono et al. | 359/246 |
| 5,923,475 A | 7/1999 | Kurtz et al. | 359/619 |
| 5,926,309 A | 7/1999 | Little | 359/293 |
| 5,926,318 A | 7/1999 | Hebert | 359/618 |
| 5,942,791 A | 8/1999 | Shorrocks et al. | 257/522 |
| 5,949,390 A | 9/1999 | Nomura et al. | 345/32 |
| 5,949,570 A | 9/1999 | Shiono et al. | 359/291 |
| 5,953,161 A | 9/1999 | Troxell et al. | 359/618 |
| 5,955,771 A | 9/1999 | Kurtz et al. | 257/419 |
| 5,963,788 A | 10/1999 | Barron et al. | 438/48 |
| 5,978,127 A | 11/1999 | Berg | 359/279 |
| 5,982,553 A * | 11/1999 | Bloom et al. | 359/627 |
| 5,986,634 A | 11/1999 | Alioshin et al. | 345/126 |
| 5,986,796 A | 11/1999 | Miles | 359/260 |
| 5,995,303 A | 11/1999 | Honguh et al. | 359/708 |
| 5,999,319 A | 12/1999 | Castracane | 359/573 |
| 6,004,912 A | 12/1999 | Gudeman | 508/577 |
| 6,016,222 A | 1/2000 | Setani et al. | 359/571 |
| 6,025,859 A | 2/2000 | Ide et al. | 347/135 |
| 6,038,057 A | 3/2000 | Brazas, Jr. et al. | 359/291 |
| 6,040,748 A | 3/2000 | Gueissaz | 335/78 |
| 6,046,840 A | 4/2000 | Huibers | 359/291 |
| 6,055,090 A | 4/2000 | Miles | 359/291 |
| 6,057,520 A | 5/2000 | Goodwin-Johansson | 200/181 |
| 6,061,166 A | 5/2000 | Furlani et al. | 359/254 |
| 6,061,489 A | 5/2000 | Ezra | 385/115 |
| 6,062,461 A | 5/2000 | Sparks et al. | 228/123.1 |
| 6,064,404 A | 5/2000 | Aras et al. | 345/507 |
| 6,069,392 A | 5/2000 | Tai et al. | 257/419 |
| 6,071,652 A | 6/2000 | Feldman et al. | 430/5 |
| 6,075,632 A | 6/2000 | Braun | 359/124 |
| 6,084,626 A | 7/2000 | Ramanujan et al. | 347/239 |
| 6,088,102 A | 7/2000 | Manhart | 356/354 |
| 6,090,717 A | 7/2000 | Powell et al. | 438/710 |
| 6,091,521 A | 7/2000 | Popovich | 359/15 |
| 6,096,576 A | 8/2000 | Corbin et al. | 438/108 |
| 6,097,352 A | 8/2000 | Zavracky et al. | 345/7 |
| 6,101,036 A | 8/2000 | Bloom | 359/567 |
| 6,115,168 A | 9/2000 | Zhao et al. | 359/247 |
| 6,122,299 A | 9/2000 | DeMars et al. | 372/20 |
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A | 11/2000 | Gelbart | 359/231 |
| 6,154,259 A | 11/2000 | Hargis et al. | 348/756 |
| 6,163,026 A | 12/2000 | Bawolek et al. | 250/351 |
| 6,163,402 A | 12/2000 | Chou et al. | 359/443 |
| 6,172,796 B1 | 1/2001 | Kowarz et al. | 359/290 |
| 6,172,797 B1 | 1/2001 | Huibers | 359/291 |
| 6,177,980 B1 | 1/2001 | Johnson | 355/67 |
| 6,181,458 B1 | 1/2001 | Brazas, Jr. et al. | 359/290 |
| 6,188,519 B1 | 2/2001 | Johnson | 359/572 |
| 6,195,196 B1 | 2/2001 | Kimura et al. | 359/295 |
| 6,197,610 B1 | 3/2001 | Toda | 438/50 |
| 6,210,988 B1 | 4/2001 | Howe et al. | 438/50 |
| 6,215,579 B1 | 4/2001 | Bloom et al. | 359/298 |
| 6,219,015 B1 | 4/2001 | Bloom et al. | 345/87 |
| 6,222,954 B1 | 4/2001 | Riza | 385/18 |
| 6,229,650 B1 | 5/2001 | Reznichenko et al. | 359/566 |
| 6,229,683 B1 | 5/2001 | Goodwin-Johansson | 361/233 |
| 6,241,143 B1 | 6/2001 | Kuroda | 228/110.1 |
| 6,251,842 B1 | 6/2001 | Gudeman | 508/577 |

| | | | |
|---|---|---|---|
| 6,252,697 B1 | 6/2001 | Hawkins et al. ............ 359/290 |
| 6,254,792 B1 | 7/2001 | Van Buskirk et al. ........ 216/13 |
| 6,261,494 B1 | 7/2001 | Zavracky et al. ........... 264/104 |
| 6,268,952 B1 | 7/2001 | Godil et al. ................ 359/291 |
| 6,271,145 B1 | 8/2001 | Toda .......................... 438/706 |
| 6,271,808 B1 | 8/2001 | Corbin ........................... 345/7 |
| 6,274,469 B1 | 8/2001 | Yu .............................. 438/592 |
| 6,286,231 B1 | 9/2001 | Bergman et al. .............. 34/410 |
| 6,290,859 B1 | 9/2001 | Fleming et al. ................ 216/2 |
| 6,290,864 B1 | 9/2001 | Patel et al. .................... 216/79 |
| 6,300,148 B1 | 10/2001 | Birdsley et al. .............. 438/15 |
| 6,303,986 B1 | 10/2001 | Shook ........................ 257/680 |
| 6,310,018 B1 | 10/2001 | Behr et al. .................. 510/175 |
| 6,323,984 B1 | 11/2001 | Trisnadi .................... 359/245 |
| 6,327,071 B1 | 12/2001 | Kimura ...................... 359/291 |
| 6,342,960 B1 | 1/2002 | McCullough ............... 359/124 |
| 6,356,577 B1 | 3/2002 | Miller ......................... 372/107 |
| 6,356,689 B1 | 3/2002 | Greywall ...................... 385/52 |
| 6,359,333 B1 | 3/2002 | Wood et al. ................ 257/704 |
| 6,384,959 B1 | 5/2002 | Furlani et al. .............. 359/291 |
| 6,387,723 B1 | 5/2002 | Payne et al. .................. 438/48 |
| 6,392,309 B1 | 5/2002 | Wataya et al. .............. 257/796 |
| 6,396,789 B1 | 5/2002 | Guerra et al. ................ 369/112 |
| 6,421,179 B1 | 7/2002 | Gutin et al. ................ 359/572 |
| 6,445,502 B1 | 9/2002 | Islam et al. ................. 359/571 |
| 6,452,260 B1 | 9/2002 | Corbin et al. .............. 257/686 |
| 6,466,354 B1 | 10/2002 | Gudeman .................... 359/247 |
| 6,480,634 B1 | 11/2002 | Corrigan ......................... 385/4 |
| 6,497,490 B1 | 12/2002 | Miller ........................ 359/614 |
| 6,525,863 B1 | 2/2003 | Riza ............................ 359/290 |
| 6,563,974 B2 | 5/2003 | Riza ............................... 385/18 |
| 6,565,222 B1 | 5/2003 | Ishii et al. ................... 359/883 |
| 2001/0019454 A1 | 9/2001 | Tadic-Galeb et al. ....... 359/649 |
| 2002/0015230 A1 | 2/2002 | Pilossof et al. ............. 359/558 |
| 2002/0079432 A1 | 6/2002 | Lee et al. ..................... 250/216 |
| 2002/0105725 A1 | 8/2002 | Sweatt et al. ............... 359/566 |
| 2002/0112746 A1 | 8/2002 | DeYoung et al. ............ 134/36 |
| 2002/0131230 A1 | 9/2002 | Potter ......................... 361/277 |

FOREIGN PATENT DOCUMENTS

| | | |
|---|---|---|
| DE | 197 23 618 A1 | 12/1997 |
| DE | 197 51 716 A1 | 5/1998 |
| DE | 198 46 532 C1 | 10/1998 |
| EP | 0 089 044 A2 | 9/1983 |
| EP | 0 261 901 A2 | 3/1988 |
| EP | 0 314 437 A1 | 10/1988 |
| EP | 0 304 263 A2 | 2/1989 |
| EP | 0 306 308 A2 | 3/1989 |
| EP | 0 322 714 A2 | 7/1989 |
| EP | 0 627 644 A3 | 9/1990 |
| EP | 0 417 039 A1 | 3/1991 |
| EP | 0 423 513 A2 | 4/1991 |
| EP | 0 436 738 A1 | 7/1991 |
| EP | 0 458 316 A2 | 11/1991 |
| EP | 0 477 566 A2 | 4/1992 |
| EP | 0 488 326 A3 | 6/1992 |
| EP | 0 499 566 A2 | 8/1992 |
| EP | 0 528 646 A1 | 2/1993 |
| EP | 0 530 760 A2 | 3/1993 |
| EP | 0 550 189 A1 | 7/1993 |
| EP | 0 610 665 A1 | 8/1994 |
| EP | 0 627 644 A2 | 12/1994 |
| EP | 0 627 850 A1 | 12/1994 |
| EP | 0 643 314 A2 | 3/1995 |
| EP | 0 654 777 A1 | 5/1995 |
| EP | 0 658 868 A1 | 6/1995 |
| EP | 0 658 830 A1 | 12/1995 |
| EP | 0 689 078 A1 | 12/1995 |
| EP | 0 801 319 A1 | 10/1997 |
| EP | 0 851 071 A2 | 7/1998 |
| EP | 1 003 071 A2 | 5/2000 |
| EP | 1 014 143 A1 | 6/2000 |
| EP | 1 040 927 A2 | 10/2000 |
| GB | 2 117 564 A | 10/1983 |
| GB | 2 118 365 A | 10/1983 |
| GB | 2 266 385 A | 10/1993 |
| GB | 2 296 152 A | 6/1996 |
| GB | 2 319 424 A | 5/1998 |
| JP | 53-39068 | 4/1978 |
| JP | 55-111151 | 8/1980 |
| JP | 57-31166 | 2/1982 |
| JP | 57-210638 | 12/1982 |
| JP | 60-49638 | 3/1985 |
| JP | 60-94756 | 5/1985 |
| JP | 60-250639 | 12/1985 |
| JP | 61-142750 | 6/1986 |
| JP | 61-145838 | 7/1986 |
| JP | 63-234767 | 9/1988 |
| JP | 63-305323 | 12/1988 |
| JP | 1-155637 | 6/1989 |
| JP | 40-1155637 | 6/1989 |
| JP | 2219092 | 8/1990 |
| JP | 4-333015 | 11/1992 |
| JP | 7-281161 | 10/1995 |
| JP | 3288369 | 3/2002 |
| WO | WO 90/13913 | 11/1990 |
| WO | WO 92/12506 | 7/1992 |
| WO | WO 02/073286 A2 | 9/1992 |
| WO | WO 93/02269 | 2/1993 |
| WO | WO 93/09472 | 5/1993 |
| WO | WO 93/18428 | 9/1993 |
| WO | WO 93/22694 | 11/1993 |
| WO | WO 94/09473 | 4/1994 |
| WO | WO 94/29761 | 12/1994 |
| WO | WO 95/11473 | 4/1995 |
| WO | WO 96/02941 | 2/1996 |
| WO | WO 96/08031 | 3/1996 |
| WO | WO 96/41217 | 12/1996 |
| WO | WO 96/41224 | 12/1996 |
| WO | WO 97/22033 | 6/1997 |
| WO | WO 97/26569 | 7/1997 |
| WO | WO 98/05935 | 2/1998 |
| WO | WO 98/24240 | 6/1998 |
| WO | WO 98/41893 | 9/1998 |
| WO | WO 99/07146 | 2/1999 |
| WO | WO 99/12208 | 3/1999 |
| WO | WO 99/23520 | 5/1999 |
| WO | WO 99/34484 | 7/1999 |
| WO | WO 99/59335 | 11/1999 |
| WO | WO 99/63388 | 12/1999 |
| WO | WO 99/67671 | 12/1999 |
| WO | WO 00/04718 | 1/2000 |
| WO | WO 00/07225 | 2/2000 |
| WO | WO 01/04674 A1 | 1/2001 |
| WO | WO 01/006297 A3 | 1/2001 |
| WO | WO 01/57581 A3 | 8/2001 |
| WO | WO 02/025348 A3 | 3/2002 |
| WO | WO 02/31575 A2 | 4/2002 |
| WO | WO 02/058111 A2 | 7/2002 |
| WO | WO 02/065184 A | 8/2002 |
| WO | WO 02/084375 A1 | 10/2002 |
| WO | WO 02/084397 A3 | 10/2002 |
| WO | WO 03/001281 A1 | 1/2003 |
| WO | WO 03/ 001716 A1 | 1/2003 |
| WO | WO 03/012523 A1 | 2/2003 |
| WO | WO 03/016965 A1 | 2/2003 |
| WO | WO 03/023849 A1 | 3/2003 |
| WO | WO 03/025628 A2 | 3/2003 |

OTHER PUBLICATIONS

Guldberg et al., "An Aluminum/SiO$_2$/Silicon–on–Sapphire Light Valve Matrix for Projection Displays," Applied Physics Letters, vol. 26, No. 7 pp. 391–393, Apr. 1, 1975.

Apte et al., "Deformable Grating Light Valves for High Resolution Displays," Solid State Actuator Workshop, Hilton Head, South Carolina, Jun. 13–16, 1994.

Sene et al., "Polysilicon micromechanical gratings for optical modulation," Sensors and Actuators, vol. A57, pp. 145–151, 1996.

Amm et al., "*Invited Paper*: Grating Light Valve™ Technology: Update and Novel Applications," SID Digest, vol. 29, 1998.

"Development of Digital MEMS–Based Display Technology Promises Improved Resolution, Contrast, And Speed", XP–000730009, 1997, p. 33 of 34.

"Micromachined Opto/Electro/Mechanical Systems," NASA Tech Briefs, Mar. 1997, pp. 50 & 52.

David M. Burns et al., "Development of Microelectromechanical Variable Blaze Gratings," Sensors and Actuators A 64 (1998), pp. 7–15.

R. Apte, "Grating Light Valves for High Resolution Displays", Solid State Sensors and Actuators Workshop, Ph D. Dissertation, Stanford University (Jun. 1994).

O. Solgaard, "Integrated Semiconductor Light Modulators for Fiber–Optic and Display Applications", Ph. D. Dissertation, Stanford University Feb., 1992.

J. Neff, "Two–Dimensional Spatial Light Modulators: A Tutorial", Proceedings of the IEEE, vol. 78, No. 5 (May 1990), pp. 826–855.

R. Gerhard–Multhaupt, "Viscoelastic Spatial Light Modulators and Schlieren–Optical Systems for HDTV Projection Displays" SPIE vol. 1255 Large Screen Projection Displays 11 (1990), pp. 69–78.

R. Gerhard–Multhaupt, "Light–Valve Technologies for High–Definition Television Projection Displays", Displays vol. 12, No 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas, R. Apte, W. Banyai, and D. Bloom, "Surface Microfabrication of Deformable Grating Valve for High Resolution Displays," The 7$^{th}$ International Conference on Solid–State Sensors and Actuators.

P. Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, Chelmsford, Essex, GB 1993.

M. Farn et al., "Color Separation by use of Binary Optics," Optics Letters, vol. 18:15 pp. 1214–1216, 1993.

P. Alvelda, "VLSI Microdisplays and Optoelectric Technology," MIT, pp. 1–93, 1995.

P. Alvelda, "VLSI Microdisplay Technology," Oct. 14, 1994.

D. Rowe, "Laser Beam Scanning," SPIE, vol. 2088, Oct. 5, 1993, 18–26.

L. Hornbeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures," Supercritical Fluids, Chapter 18, American Chemical Society, pp. 255–269, 1997.

Buhler et al., "Linear Array of Complementary Metal Oxide Semiconductor Double–Pass Metal Micromirrors," Optical Engineering, vol. 36, No. 5, pp. 1391–1398, May 1997.

Gani et al., "Variable Gratings for Optical Switching: Rigorous Electromagnetic Simulation and Design," Optical Engineering, vol. 38, No. 3, pp. 552–557, Mar. 1999.

R. Tepe et al., "Viscoelastic Spatial Light Modulator with Active Matrix Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997 pp. 377 of 379.

N. J. Frigo et al., "A Wavelength–Division Multiplexed Passive Optical Network with Cost–Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demonstrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum—Optical Components, Feb. 2001, pp. 1 of 10.

R. Plastow Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

S. T. Pai, et al., "Electromigration in Metals", Received Jun. 4, 1976, pp. 103–115.

Olga B. Spahn, et al., "High Optical Power Handling of Pop–Up Microelectromechanical Mirrors", Sandia National Laboratories, IEEE 2000, pp. 51–52.

David M. Burns, et al. "Optical Power Induced Damage to Microelectromechanical Mirrors", Sensors and Actuators A 70, 1998, pp. 6–14.

V.S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927–931.

F.A. Houle, "Dynamics of SiF4 desorption during etching of silicon by XeF2," J. Chem. Phys. 87 (3), Aug. 1 1987, pp. 1866–1872.

Mehran Mehregany, "Microelectromechanical Systems," 1993 IEEE, pp. 14–22.

D. Moser et al., "A CMOS Compatible Thermally Excited Silicon Oxide Beam Resonator with Aluminium Mirror," Physical Electronics Laboratory, 1991 IEEE, pp. 547–550.

M. Parameswaran et al., "Commercial CMOS Fabricated Integrated Dynamic Thermal Scene Simulator," 1991 IEEE, pp. 29.4.1–29.4.4.

M. Parameswaran et al., "CMOS Electrothermal Microactuators," Depart of Electrical Engineering, 1990 IEEE, pp. 128–131.

U. Streller et al., "Selectivity in dry etching of Si(100) with XeF2 and VUV light," Applied Surface Science 106, (1996), pp. 341-346.

M.J.M. Vugts et al., "Si/XeF2 etching: Temperature dependence," 1996 American Vacuum Society, pp. 2766–2774.

Krummenacher et al., "Smart Temperature Sensor in CMOS Technology," Sensors and Actuators, A–21–A–23 (1990), pp. 636–638.

Henry Baltes, "CMOS as sensor technology," Sensors and Actuators A. 37–38, (1993), pp. 51–56.

Thomas Boltshauser et al., "Piezoresistive Membrane Hygrometers Based on IC Technology," Sensor and Materials, 5,3, (1993), pp. 125–134.

Z. Parpia et al., "Modelling of CMOS Compatible High Voltage Device Structures," pp. 41–50.

Jon Gildemeister, "Xenon Difluoride Etching System," 1997, UC Berkeley MicroTabrication Manual Chapter 7.15, pp. 2–5.

W. Riethmuller et al., "A smart accelerometer with on–chip electronics fabricated by a commercial CMOS process, " Sensors and Actuators A. 31, (1992), 121–124.

W. Gopel et al., "Sensors –A Comprehensive Survey," vol. 7, Weinheim New York, 44 pgs.

D.E. Ibbotson et al., "Comparison of XeF2 and F–atom reations with Si and SiO2," 1984 American Institute of Physics, pp. 1129–1131.

D. E. Ibbotson et al., "Plasmaless dry etching of silicon with fluorine–containing compounds," 1984 American Institute of Physics, pp. 2939–2942.

M.H. Hecht et al., "A novel x–ray photoelectron spectroscopy study of the Al/SiO2 interfaces," 1985 American Institute of Physics, pp. 5256–52616.

Daniel L. Flamm et al., "XeF2 and F–Atom Reactions with Si: Their Significance for Plasma Etching," Solid State Technology, V. 26, #4, 4/83, pp. 117–121.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun. 94, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison –Wesley, $2^{nd}$ edition, 1987, Adelphi University, pp. 163–169.

E. Hecht, "Optics", Addison–Wesley, $2^{nd}$ edition, 1987, Adelphi University, pp. 358–360.

T. Glaser et al., "Beam switching with binary single–order diffractive grating", XP–000802142, Optics Letters, Dec. 15, 1998, vol. 23, No. 24, pp. 1933 of 1935.

P. C. Kundu et al., "Reduction of Speckle Noise by Varying the Polarisation of Illuminating Beam", XP–002183475, Dept. of Applied Physics, Calcutta University, 1975, pp. 63–67.

J. W. Goodman, "Some Fundamental Properties of Speckle", XP–002181682, Dept. of Electrical Engineering, Stanford University, 1976, pp. 1146–1150.

Lingli Wang et al., "Speckle Reduction in Laser Projection Systems by Diffractive Optical Elements", XP–000754330, Applied Optics, Apr. 1, 1998, vol. 37, No. 10, pp. 1770–1775.

R.W. Corrigan et al., "Calibration of a Scanned Linear Grating Light–Valve, Projection System for E–Cinema Applications", Silicon Light Machines, SID'99, San Jose, CA, 27 pps. 1999.

R.W. Corrigan et al., "Calibration of a Scanned Linear Grating Light–Valve, Projection System", Silicon Light Machines, San Jose, CA, 4 pgs, May 18, 1999.

"Introduction to Cryptography", http://www.ssh.fi/tech/crpto/into.html, 35 pgs., Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators, " Newport Corp., Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice," Prentice Hall, New York, 1995, pp. 407–408.

C. Tew et al., "Electronic Control of a Digital Micromirror Device for Projection Displays", Proceedings of the 1994 IEEE International Solid–State Circuits Conference, 1994.

Henck, S.A., "Lubrication of Digital Micromirror Devices™", Tribology Letters, No. 3, pp. 239–247, 1997.

K. W. Goossen et al., Silicon Modulator Based on Mechanically–Active Anti–Reflection Layer with 1 Mbit/sec Capability for Fiber–in–the–Loop Applications, IEEE Protonics Technology Letters, vol. 6, No. 9, Sep. 1994, pp. 1119–1121.

J. A. Walker et al., "Demonstration of a Gain Flattened Optical Amplifier with Micromechanical Equalizer Element", Lucent Technologies, pp. 13–14.

A. P. Payne et al., "Resonance Measurements of Stresses in Al/$Si_3N_4$ Micro–Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault–Tolerant Multiwavelength Programmable Fiber–Optic Attenuator Using a Two–Dimensional Digital Micromirror Device", OPTICS LETTERS, Mar. 1, 1999, vol. 24, No. 5, pp. 282–284.

N. A. Riza et al., "Synchronous Amplitude and Time Control for an Optimum Dynamic Range Variable Photonic Delay Line", APPLIED OPTICS, Apr. 10, 1999, vol. 38, No. 11, pp. 2309–2318.

P. Alvelda et al., "44.4: Ferroelectric Microdisplays Using Distortion–Compensated Pixel Layouts" , SID 95 DIGEST, XP 2020715, pp. 931–933.

* cited by examiner

HIGH CONTRAST GRATING LIGHT VALVE TYPE DEVICE

FIELD OF THE INVENTION

The invention relates to grating light valve devices. More particularly, the present invention relates to grating light valve devices with an asymmetric configuration of movable ribbons for optimizing diffraction conditions.

BACKGROUND OF THE INVENTION

Recent developments in the miniaturization of various electro-mechanical devices, also known as micro machines, has led to the emergence of miniature diffraction gratings. One type of miniature diffraction grating is a grating light valve. A grating light valve is a device that is capable of alternating between the conditions for constructive and destructive interference with an incident light source $\lambda$ to modulate the reflected light source between a minimum and maximum intensity value, preferably in a stepwise fashion. Grating light valves have applications in display, print, optical and electrical device technologies. Examples of a grating light valves and their uses are disclosed in the U.S. Pat. No. 5,311,360, issued to Bloom et al., which is hereby incorporated by reference.

Figure 1A:
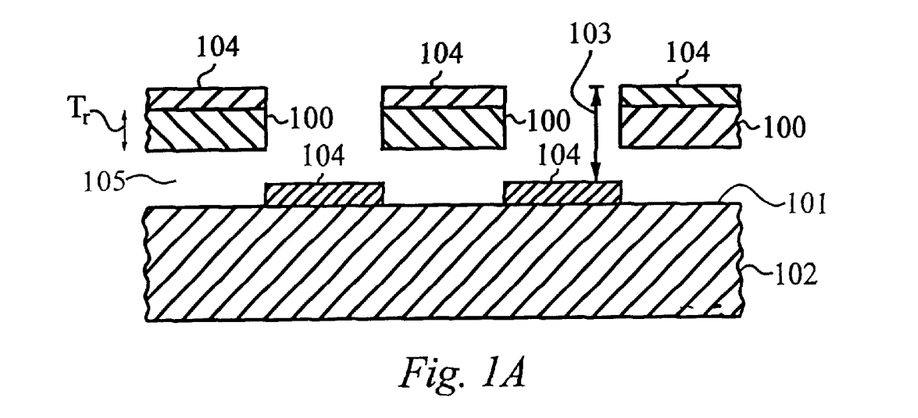
FIG. 1a–b are cross sectional representations of a grating light valve with a reflective ribbons that are movable relative to the reflective surfaces of a substrate to alternated between the conditions for constructively and destructively interfere with an incident light source having a wavelength λ.

Referring to FIG. 1a, the grating light valve construction as taught in the U.S. Pat. No. 5,311,360, has a plurality of movable ribbons 100 that are spatially arranged over a substrate 102. The surfaces 104, corresponding to the ribbon tops and the regions of the substrate between the ribbons, are reflective. The surfaces 104 are made to be reflective by depositing a thin film of reflective material, such as silver or aluminum on the substrate 102 and the ribbons 100. The ribbons and the substrate structure are micro fabricated from a silicon-based materials. The height difference 103 between the reflective surfaces 104 of the substrate 102 and the reflective surfaces 104 of the ribbons 100 are configured to be $\lambda/2$ when the ribbons 100 are in the up position as shown in FIG. 1a. When light having a wavelength $\lambda$ impinges on the compliment of reflective surfaces 104, light that is reflected from the surfaces 104 of the substrate 102 and ribbons 100 will be in phase. Light which strikes the reflective surfaces 104 of the substrate 102 travels $\lambda/2$ further than the light striking the reflective surfaces 104 of the ribbons 100. Then the portion of light that is reflected back from the reflective surfaces 104 of the substrate 102 returns traveling an addition $\lambda/2$ for a total of one complete wavelength $\lambda$. Therefore, the compliment of the reflective surfaces 104 function as a mirror to the incident light source with a wavelength $\lambda$.

Figure 1B:
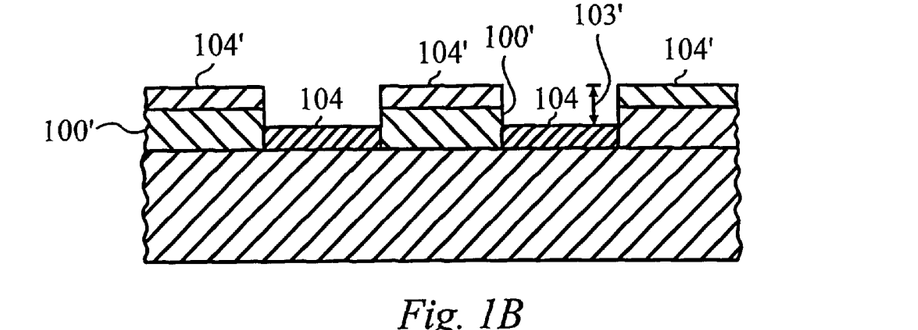

By applying an appropriate bias voltages across the ribbons 100 and the substrate 102, a portion of the ribbons 100 move towards and contact the substrate 102, as shown in FIG. 1b. The thickness $T_r$ of the ribbons 100 is designed to be $\lambda/4$ such that the distance 103' is also $\lambda/4$. When light having a wavelength $\lambda$ impinges on surfaces 104 and 104' with the ribbons 100 in the down position, as shown in FIG. 1b, the portion of light reflected from the surfaces 104' of the ribbons 100 will be out of phase with the portion of light reflected from the surfaces 104 of the substrate 102, thereby generating the conditions for destructive interference. By alternating the ribbons between the positions for constructive interference, as shown in FIG. 1a, and the positions for destructive interference, as shown in FIG. 1b, the grating light valve is capable of modulating the intensity of reflected light from an impinging light source having a wavelength $\lambda$.

SUMMARY OF THE INVENTION

Figure 2A:
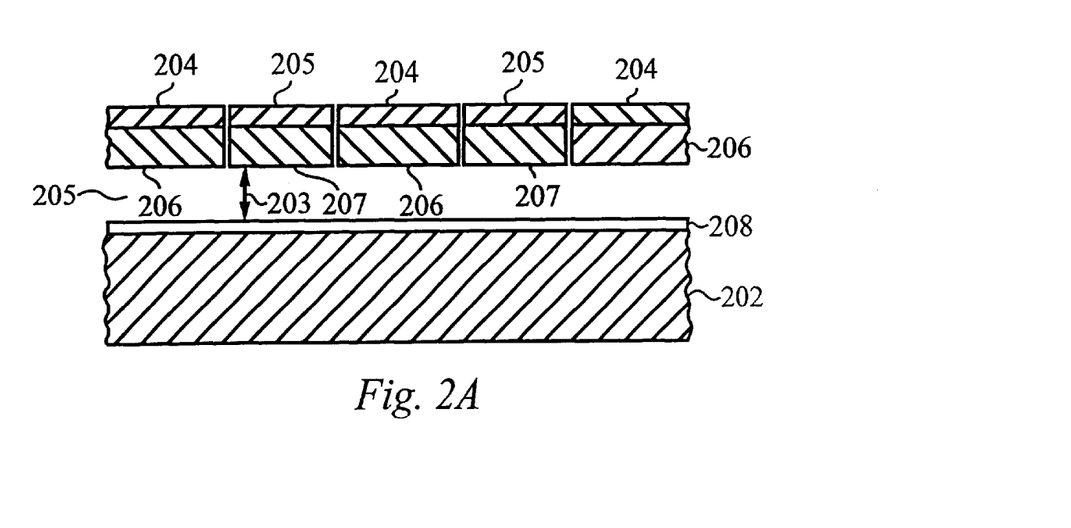
FIG. 2a–b are cross sectional representations of a flat diffraction grating light valve with two sets of alternating reflective ribbons that are movable relative to each other to alternate between the conditions for constructively and distractively interfere with an incident light source having a wavelength λ.
Figure 2B:
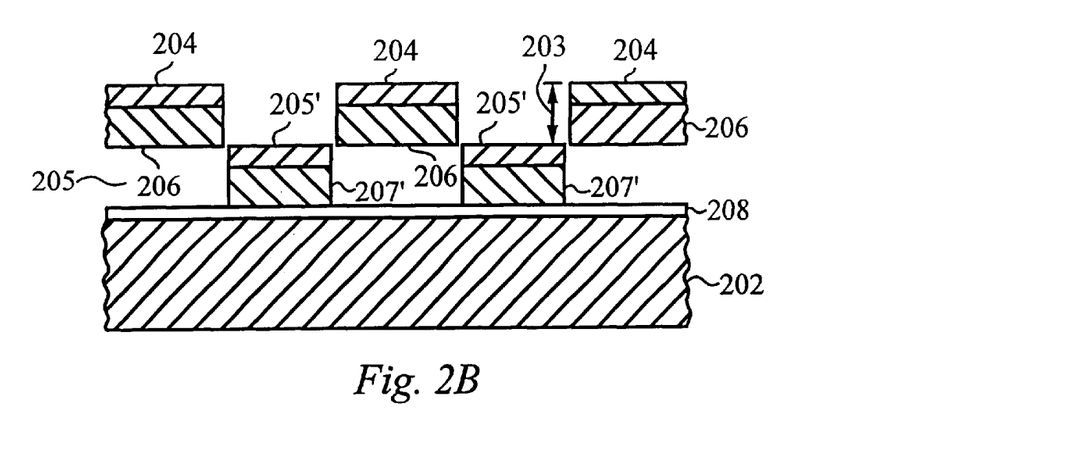

There have been several advances in grating light valve devices both in the fabrication processes and in design. For example, flat diffraction grating light valves and their advantages are described in the U.S. Pat. No. 5,841,579 and the U.S. Pat. No. 5,808,797, both issued to Bloom et al., the contents of which are incorporated by reference. FIGS. 2a–b illustrate cross sectional views of a flat diffraction grating light valve and its operation. Flat diffraction grating light valves, have at least two sets of alternating ribbons 206 and 207 that are approximately in the same reflective plane.

Referring to FIG. 2a, the ribbons 206 and 207 are suspended over a substrates structure 202 by a distance 205. The ribbons 206 and 207 are provided with a reflective surfaces 204 and 205, respectively. Preferably, the surface of the substrate 202, or a portion thereof, also has a reflective surface 208. The reflective surfaces of the substrate 208 and the reflective surfaces of the ribbons 204 and 205 are preferably configured to be separated by a distance approximately equal to a multiple of $\lambda/2$ of the impinging light source. Thus the portion of light that is reflected from the compliment of surfaces 204, 205 and 208 are all phase, constructively interfere and the maximum intensity is observed. In operation, the flat diffraction grating light valve alternates between the conditions for constructive and destructive interference by moving the first set of ribbons 206 or the second set of ribbons 207 relative to each other by a distance corresponding to $\lambda/4$.

In one mode of operation, light is modulated by moving one set of alternating ribbons relative to a stationary set of alternating ribbons. The ribbons that are moved are referred to as the active ribbons and the stationary ribbons are referred to as the bias ribbons. The active ribbons are moved by any number of means including mechanical means, but are preferably moved by applying a sufficient bias voltage across the active ribbon and the substrate created Coulombic attractions and/or repulsions between the the active ribbons and the substrate.

Now referring to FIG. 2b, when a sufficient bias voltage is applied across the active of ribbons 207 and the substrate 202, the ribbons 207 are displaced relative to the bias ribbons 206 by a distance 203 that is approximately equal to a multiple of $\lambda/4$. Accordingly, the portions of light that are reflected from the surfaces 205' of the active ribbons 207 will destructively interfere with the portion of light that are reflected of the surfaces 204 of the bias ribbons 206. It will be clear to one skilled in the art that a grating light valve may be configured to modulated an incident light source with a wavelength $\lambda$ in other operative modes. For example, both sets of ribbons 206 and 207 may be configured to move and separate by multiples of $\lambda/4$ in order to alternate between the conditions for constrictive and destructive interference.

While current designs of grating light valves have improved their operating efficiency and reliability, there is continued need to further optimized of grating light valve devices for use in display, print, optical and electrical device technologies.

In accordance with the instant invention a grating light valve has a diffraction cross section that is capable of interfering constructively and destructively with an incident light source having a wavelength λ. The grating light valve of the instant invention is configured to operated with any number of light sources, but is most useful for diffracting incident light sources with wavelengths between 300 and 3000 nanometers. The grating light valve preferably has a plurality of movable ribbons each coated with a reflective layer.

The plurality of moveable ribbons are comprised of at least two of sets of alternating ribbons. The ribbon in the first set have average widths $W_a$ that are preferably 1 to 6 microns in the diffraction region of the device. The ribbons in the second set have average widths Wb that are preferably 0.5 to 5 microns in that diffraction region of the device. The ribbons of the first set and the ribbons of the second set are uniformly separated by an average width $W_s$ of 0.5 to 2.0 microns in the diffraction region of the device.

The ribbons are suspended over reflective regions of a substrate element. The reflective regions of the substrate correspond to the spaces $W_s$ between the alternating ribbons. In the constrictive interference position the reflective surface of the of ribbons are preferably in the same reflective plane and separated from the reflective regions of the substrate by a distance approximately equal to a multiple of λ/2 such that the compliment of reflective surface including the reflective regions of the substrate act as a mirror.

The diffraction efficiency and the contrast of the grating light device is improved by configuring the device to generate amplitudes of reflected light from the first set of ribbons that is substantially equal to the sum of the amplitudes of the reflected light from the second set of ribbons and the reflective light from the reflective regions of the substrate. Preferably, the amplitude matching is accomplished by making $W_a$ equal to the sum of a with $W_b$ and $W_s$ within the diffraction region of the grating light valve and by providing the ribbons and the reflective regions of the substrate between the ribbons with the same reflective surfaces. Accordingly, in the destructive interference position, the compliment of reflective surfaces maximize cancellation of the reflected light and, hence, maximize the contrast of the grating light valve.

In operation, the first set of ribbons is moved by a distance equal to a multiple of λ/4 in order to switch between the conditions for constructive and destructive interference. Preferably, the first set of ribbons is move towards the reference surface of the substrate by applying a sufficient bias voltage across the first set of ribbons and the substrate element. Alternatively, both the first set and the second set of ribbons are move in opposite directions relative to the reference surface of the substrate to switch between the conditions for constructive and destructive interference.

DETAILED DESCRIPTION OF THE INVENTION

Flat diffraction grating light valves, described above, which have at least two sets of movable ribbons are preferably over a single set of movable ribbons, for performance and manufacturing reasons that are detailed in the U.S. Pat. No. 5,841,579. While the flat diffraction grating light valve is preferred, there are still several short comings that must be overcome to optimize the contrast and efficiency of the device.

One inefficiency in a flat grating light valve arises because of the spaces between the alternating active and bias ribbons. The spaces between the alternating active and bias ribbons are required because of manufacturing tolerances and for operation tolerances that allow the active ribbons move relative to the bias ribbons. As a result, a considerable portion of the incident light passes between the ribbons and impinges the regions of the substrate corresponding to the spaces. If these regions of the substrate surface are not properly construction to reflect the incident light source or are not properly phase matched with the active and the bias ribbons, then the maximum efficiency of the device is not achieved and the maximum contrast will not be observed.

In other words to optimize the contrast and efficiency of a light grating valve, light that is reflected from interference surfaces within the diffraction region of a grating light valve must be completely in phase for constructive interference and completely out of phase for destructive interference. Further, the interfering light reflected from the surfaces that are interfering must have the same amplitude to achieve total cancellation of the light.

Thus to improve the efficiency of the light grating device and to optimized the contrast of the modulated light, the instant invention provides for reflective surfaces on the substrate in the regions corresponding to the spaces between the alternating ribbons which are matched to the bias and active ribbons. Preferably this is accomplished by providing reflective surfaces on the ribbons and on the regions of the substrate between the ribbons which have the same reflectivity. This goal is further accomplished by providing an asymmetric ribbon configuration such that the reflective surface area of interfering surfaces are matched.

Figure 3:
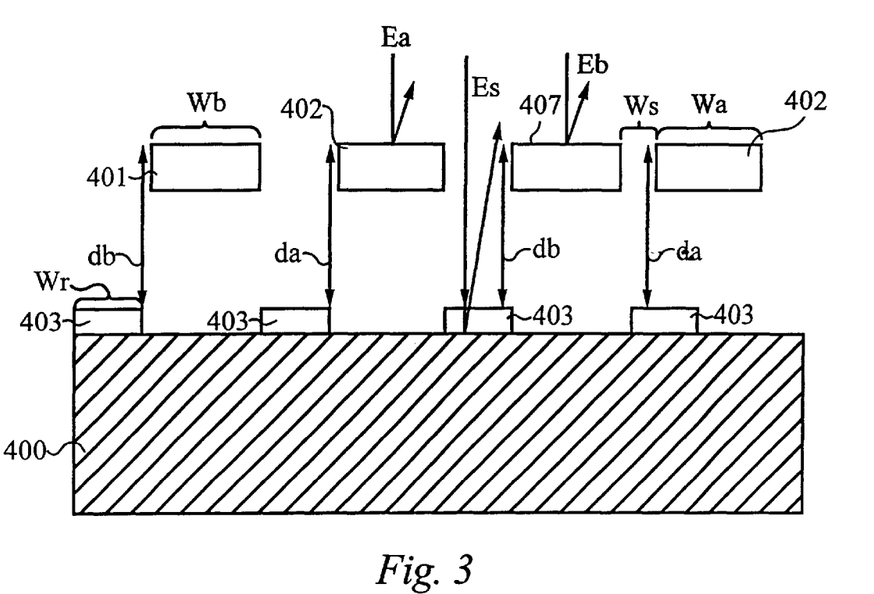
FIG. 3 is a cross sectional representation of a grating light valve with reflective active ribbons and alternating reflective bias ribbons spatially arranged over a substrate with reflective regions between the ribbons.

FIG. 3 show a simplified cross sectional representation of a flat grating light valve. The grating light valve has a set of bias ribbons 401 and a set of active ribbons 402. The device is configured to constructively and destructively interfere with an incident light source (not shown) having a wavelength λ. In order to maximized light $E_a$ and $E_b$ that is reflected from the top surface of the ribbons 401 and 402, the ribbons 401 and 402 preferably form a single reflective plane. Further, to maximized the light Es that is reflected from regions 403 of the substrate, the distances da and db are preferably a multiple of λ/2.

According to the previous flat grating light valve designs, the widths Wb of the bias ribbons 401 and the widths Wa of the active ribbons are approximately the same, within manufacturing tolerances of ±10%. In operation the active ribbons 402 are moved toward the substrates 400 by a distance that is equal to a multiple of λ/2 such that the portions of the incident light $E_b$ that are reflected from the bias ribbons 401 and the portions of the incident light Ea that are reflected from the active ribbons 402 are out of phase 403 and destructively interfere. In this case, even if $E_b$ and $E_b$ completely cancel the total light that is reflected will still include a contribution from Es and, therefore, the contrast is not optimized.

In order to optimized the condition for destructive interference and, therefore, optimize the contrast of the grating light valve, the grating light valve of the instant invention utilizes ribbons that exhibit asymmetric reflection amplitudes. Preferably, the ribbons are configured such that the amplitude of the incident light that is reflected by the set of active ribbons is substantially matched to the amplitude of incident light that is reflected by the sum of the set of bias ribbons and reflective regions of the substrate. Preferably, all of the reflective surfaces have approximately the same reflectivity and the active ribbons have a reflective surface areas that are approximately equal to the sum of the reflective surface areas of the bias ribbons and the reflective regions of the substrate.

The ribbons are preferably elongated and rectangular-like in shape. Further, the ribbons are preferably uniformly spaced. Accordingly, the asymmetric reflectivity of the ribbons is preferably achieved by making the average width $W_a$ each of the active ribbons greater than the average width $W_b$ each of the basis ribbons such that the sum of $W_b$ and the spaces $W_s$ between each of the alternating active and bias ribbons is approximable equal to $W_a$. Most preferably, the widths of the active ribbons $W_a$ are made to be 1 unit wider than the widths $W_b$ of the bias ribbons and, therefore, the widths $W_s$ of the spaces between the alternating active and bias ribbons is approximately equal to1 unit.

Figure 4:
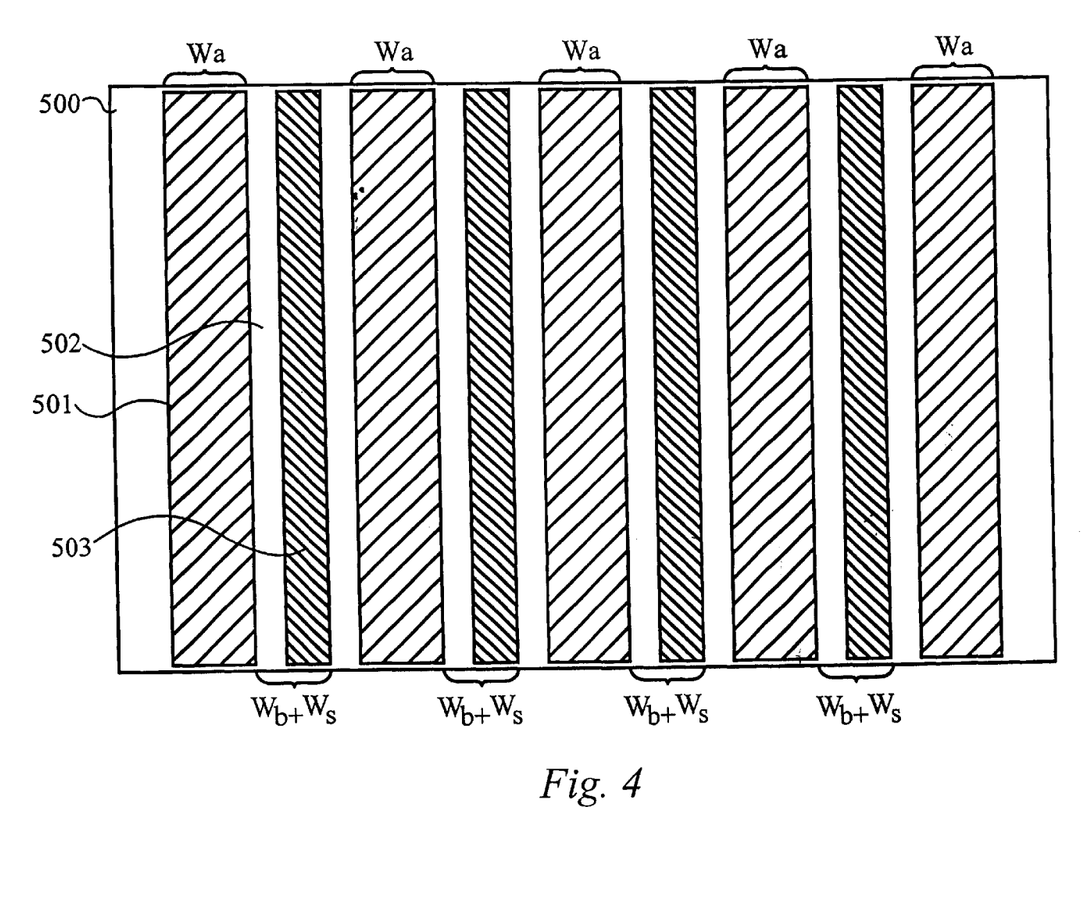
FIG. 4 illustrates a top schematic view of a grating light valve with asymmetric ribbons in accordance with the instant invention.

FIG. 4 shows a schematic representation of a grating light valve configured with sets of asymmetric ribbons 501 and 503, in accordance with the instant invention. The asymmetric ribbons are uniformly spaced by a distance $W_s$ and the average widths $W_a$ of active ribbons 501 are approximately equal to the width $W_b$ of the basis ribbons and the spacings $W_s$. The ribbons 501 and 503 are co-planar in the absence of and applied voltage. To place the ribbons in the condition for destructive interference with an incident light source having a wavelength λ, the active ribbons 501 are displaced towards the substrate 500 by a distance approximately equal to a multiple of λ/4.

Figure 5:
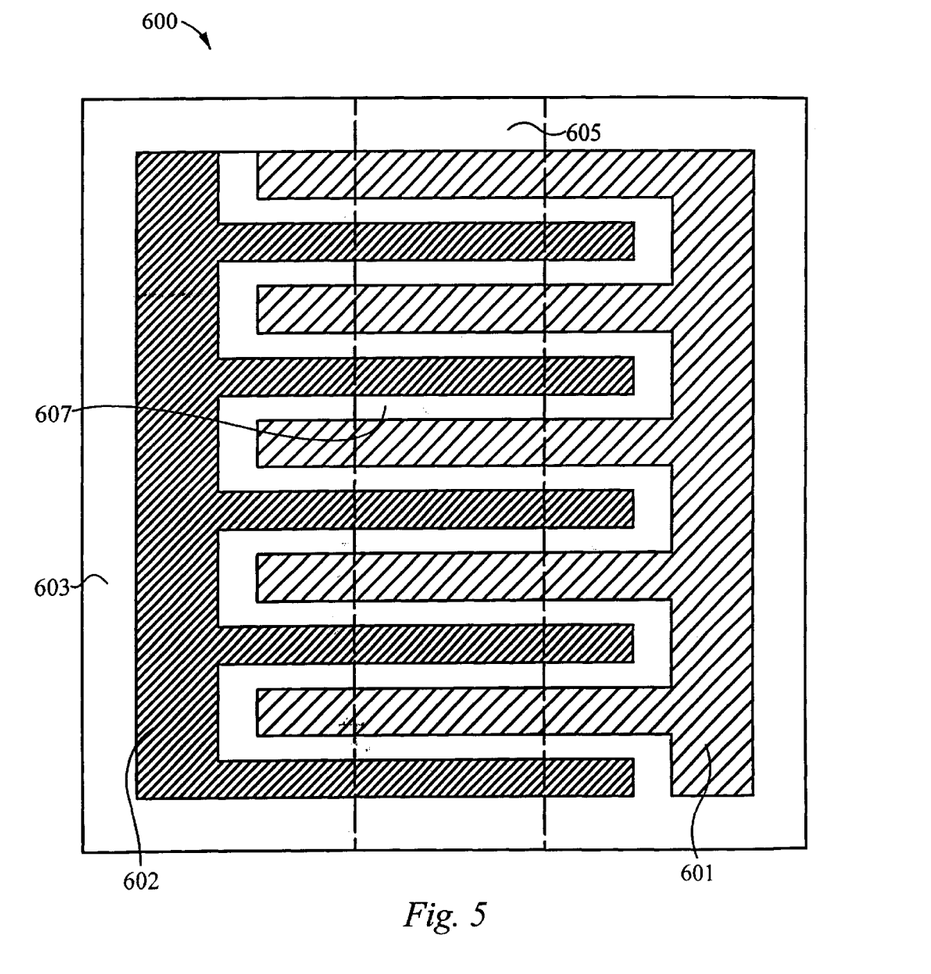
FIG. 5 illustrates a grating light valve with reflective elements attached to a substrate with each of the reflective elements having spaced ribbons for generating the conditions for constructive and destructive interference with an incident light source having a having a wavelength λ.

FIG. 5 shows a schematic representation of a grating light valve 600 in accordance with the instant invention. The grating light value 600 has at least two reflective elements 601 and 602 that are attached to a substrate element 603. Each of the reflective elements 601 and 602 has a plurality of ribbons which are suspended over the substrate surface 603 and are capable of being moved relative to each other to constructively and destructively interfere with light source having a wavelength λ which is incident on the diffraction region 605 of the device 600. Preferably the regions of the substrate 607 between the ribbons and in the diffraction region 605 are also reflective. The total reflective surface area of the reflective element 601 is approximately equal to the total reflective surface area of the reflective element 602 and the reflective surface area of the substrate regions 607 corresponding to the diffraction region 605 of the device 600.

In operation the ribbon of the reflective elements 601 and 602 are substantial co-planar and suspended above the reflective regions 607 of the substrate 603 by a distance equal to a multiple of λ/2 to achieve the condition for constructive interference and maximum brightness. To achieve the condition for destructive interference, the ribbons of the reflective element 601 are moved toward the substrate by a distance that is equal to λ/4, as described in detail above.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiment chosen for illustration without departing from the spirit and scope of the invention.

What is claimed is:

1. A light modulator comprising a diffraction region comprising a first set of ribbons each with a reflective surface area $E_a$ and second set of ribbons each with a reflective surface area $E_b$, wherein the first set and second set of ribbons are alternating and spaced over a reference surface with a reflective surface regions having reflective surface areas $E_s$ between each alternating ribbon of the first set and second set and wherein $E_a$ is approximately equal to the sum of $E_b$ and $E_s$, $E_b$ is greater than or equal to $E_s$ and $E_s$ is not equal to zero.

2. The light modulator of claim 1, wherein the ribbons of the first set and the ribbons of the second set are elongated, wherein the ribbons of the first set each have an average width $W_a$, the ribbons of the second set each have an average width $W_b$ and alternating ribbons of the first set and second set are separated by an average distance $W_s$.

3. The light modulator of claim 2, wherein $W_a$ is approximately equal to the sum of $W_b$ and $W_s$.

4. The light modulator of claim 2, wherein the first set of ribbons is configure to move by a multiple of λ/4 relative to the reference surface of a substrate by applying a bias voltage across the first set of ribbons and the substrate element.

5. The light modulator of claim 4, wherein the second set of ribbons is configure to move a multiple of $\lambda/4$ relative to the reference surface of the substrate by applying a bias voltage across the second set of ribbons the reference surface.

6. The light modulator of claim 1, wherein the top surfaces of the ribbons in the first set the top surfaces of the ribbons in the second set and regions of the reference surface between the alternating ribbons of the first set and the second set have reflective metallized layers.

7. The light modulator of claim 6, wherein the reflective metallized layers comprise Aluminum.

8. A method of modulating light with a wavelength $\lambda$ a comprising the steps of:
   a. suspending a first set of reflective ribbons by a first distance corresponding to a multiple of $\lambda/2$ over a reference surface with reflective regions, wherein each ribbon of the first set has a first reflective cross section;
   b. suspending a second set reflective ribbons by a second distance corresponding to a multiple $\lambda/2$ over the reference surface, wherein each ribbon of the second set has a second reflective cross section and wherein the first set and the second set of ribbons are spatially arranged such that the ribbon of the first set and the second set are alternating and spaced with reflective regions of the reference surface aligned with the spaces between the ribbon of the first set and the second set of ribbons, wherein the first reflective cross section is approximately equal to the sum of the second reflective cross section and the reflective region of the reference surface;
   c. shining a light an incident light source with a wavelength $\lambda$ on the reflective surfaces of the first set of ribbons and the second set of ribbons; and
   d. moving the first set of reflective ribbons relative to the second set of reflective ribbons by a multiple of distance $\lambda/4$.

9. The method of claim 8, wherein the step of alternating the first set of reflective ribbons relative to the second set of reflective ribbon is accomplished by applying a sufficient bias to at least one set of the reflective ribbons.

10. The method of claim 8, wherein the incident light source has a wave length between 300 and 4000 nanometers.

* * * * *